United States Patent [19]
Becker et al.

[11] Patent Number: 6,124,229
[45] Date of Patent: *Sep. 26, 2000

[54] PROCESS FOR THE PREPARATION OF METALLOCENE CATALYST SYSTEMS ON INERT SUPPORT MATERIAL USING GAS PHASE REACTOR

[75] Inventors: Ralf-Jurgen Becker, Hamm; Rainer Rieger, Bonn, both of Germany

[73] Assignee: Witco GmbH, Bergkamen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/701,238

[22] Filed: Aug. 22, 1996

[30] Foreign Application Priority Data

Sep. 13, 1995 [EP] European Pat. Off. ............ 95114345

[51] Int. Cl.$^7$ .......................... B01J 31/00; B01J 37/00; C08F 4/02; C08F 4/60
[52] U.S. Cl. ................... 502/102; 502/103; 502/104; 502/108; 502/107; 502/111; 502/117; 502/523
[58] Field of Search .................... 502/104, 106, 502/107, 111, 523

[56] References Cited

U.S. PATENT DOCUMENTS

| | | | |
|---|---|---|---|
| 2,477,019 | 7/1949 | Utterback et al. | 502/523 |
| 3,168,484 | 2/1965 | Engel et al. | 502/106 |
| 3,300,458 | 1/1967 | Manyik et al. | 502/111 |
| 3,884,832 | 5/1975 | Pullukat et al. | 502/106 |
| 4,082,692 | 4/1978 | Goldie | 502/106 |
| 4,921,825 | 5/1990 | Kioka et al. | 502/104 |
| 5,026,797 | 6/1991 | Takahashi | 502/117 |
| 5,086,025 | 2/1992 | Chang | 502/111 |
| 5,157,008 | 10/1992 | Sangokoya et al. | 502/111 |
| 5,206,401 | 4/1993 | Deavenport et al. | 556/175 |
| 5,234,878 | 8/1993 | Tsutsui et al. | 502/111 |
| 5,308,815 | 5/1994 | Sangokoya | 502/104 |
| 5,340,882 | 8/1994 | Kuramoto | 526/119 |
| 5,378,672 | 1/1995 | Shamshoum et al. | 502/523 |
| 5,534,474 | 7/1996 | Becker et al. | 502/111 |
| 5,648,310 | 7/1997 | Wasserman et al. | 502/117 |
| 5,674,795 | 10/1997 | Wasserman et al. | 502/117 |
| 5,721,184 | 2/1998 | Brinen et al. | 502/152 |
| 5,728,640 | 3/1998 | Lu et al. | 502/107 |
| 5,731,451 | 3/1998 | Smith et al. | 502/104 |
| 5,767,032 | 6/1998 | Hokkanen et al. | 502/104 |
| 5,789,332 | 9/1998 | Kutschera et al. | 502/104 |
| 5,922,818 | 7/1999 | Morterol | 502/523 |

FOREIGN PATENT DOCUMENTS

| | | |
|---|---|---|
| 0 344 887 A2 | 12/1989 | European Pat. Off. . |
| 0 369 675 A1 | 5/1990 | European Pat. Off. . |
| 0 429 436 A1 | 4/1991 | European Pat. Off. . |
| 0 442 725 A2 | 8/1991 | European Pat. Off. . |
| 0 480 390 A2 | 4/1992 | European Pat. Off. . |
| 0 520 732 A1 | 12/1992 | European Pat. Off. . |
| 0 530 908 A1 | 3/1993 | European Pat. Off. . |
| 0 569 128 A2 | 9/1993 | European Pat. Off. . |
| WO 94/14856 | 7/1994 | European Pat. Off. . |
| 0 623 624 A1 | 11/1994 | European Pat. Off. . |
| 0 672 671 A1 | 9/1995 | European Pat. Off. . |
| 50-15475 | 6/1975 | Japan ................... 502/523 |

OTHER PUBLICATIONS

Chien, James C.W. et al. "Olefin Copolymerization with Metallocene Catalysts", *Journal of Polymer Science Chemistry*, vol. 29, 1603–1607 (1991).

*Primary Examiner*—Mark L. Bell
*Assistant Examiner*—J. Pasterczyk
*Attorney, Agent, or Firm*—Scully, Scott, Murphy & Presser

[57] ABSTRACT

Disclosed is a process for preparing a supported metallocene catalyst by introducing, in a first stage, a gas stream comprising an organoaluminum compound, an inert support material and water, into a first gas phase reactor; allowing the mixture to react under conditions effective to form an aluminoxane supported on said inert support material; metering a second gas stream comprising a metallocene into said gas phase reactor; allowing said mixture to react under conditions effective to form a supported metallocene catalyst; and drying, in a second stage, said supported metallocene catalyst, wherein said drying is carried out in a gas phase reactor. An alternative process comprises introducing, in a first stage, a gas stream comprising an organoaluminum compound, an inert support material, a metallocene and water, into a first gas phase reactor; allowing the mixture to react under conditions effective to form an aluminoxane supported with said metallocene on said inert support material; and drying, in a second stage, said supported metallocene catalyst, wherein said drying is carried out in a gas phase reactor.

34 Claims, 2 Drawing Sheets

Prior Art

PROCESS FOR THE PREPARATION OF METALLOCENE CATALYST SYSTEMS ON INERT SUPPORT MATERIAL USING GAS PHASE REACTOR

BACKGROUND OF THE INVENTION

Metallocene catalyst systems are gaining importance as a new generation of catalyst systems for the preparation of polyolefins ("Single Site Catalysts"). These new catalysts essentially comprise, as already known from conventional Ziegler-Natta catalysts, a transition metal compound as the catalyst and a cocatalyst component, for example an alkylaluminoxane, in particular methylaluminoxane. Cyclopentadienyl, indenyl or fluorenyl derivatives of group IVa of the Periodic Table of the Elements are preferably employed as the transition metal compound. In contrast to conventional Ziegler-Natta catalysts, such systems not only have, in addition to a high activity and productivity, the capacity for targeted control of the product properties as a function of the components employed and the reaction conditions, but furthermore open up access to hitherto unknown polymer structures with promising properties with respect to industrial uses.

A large number of publications which relate to the preparation of specific polyolefins with such catalyst systems have appeared in the literature. A disadvantage in almost all cases, however, is the fact that a large excess of alkylaluminoxanes, based on the transition metal components, is necessary to achieve acceptable productivities (the ratio of aluminum in the form of the alkylaluminoxane to the transition metal is usually about 1000:1). Because of the high cost of the alkylaluminoxanes on the one hand and because of additional polymer working-up steps ("deashing steps") which are necessary in some cases on the other hand, polymer production on an industrial scale based on such catalyst systems would often be uneconomical. Furthermore, the solvent toluene which is often used for formulation of alkylaluminoxanes, in particular methylaluminoxane, is becoming increasingly undesirable for reasons of the storage stability of highly concentrated formulations (marked tendency of the aluminoxane solutions to form a gel) and for toxicological reasons with respect to the field of use of the polyolefins which finally result.

A significant reduction in the amount of alkylaluminoxane required with respect to the transition metal component can be achieved by applying the alkylaluminoxane to inert support materials, preferably $SiO_2$ (J. C. W. Chien, D. He, J. Polym. Science Part A, Polym. Chem., Volume 29, 1603–1607 (1991). Such supported materials furthermore have the advantage of being easy to separate off in the case of polymerizations in a condensed phase (preparation of highly pure polymers) and of being usable as free-flowing powders in modern gas phase processes, in which the particle morphology of the polymer can be determined directly by the particle form of the support. Alkylaluminoxanes fixed on a support are furthermore physically more stable, as dry powders, than solutions of comparable Al content. This applies in particular to methylaluminoxane, which, as already mentioned, tends to form a gel in solution in toluene after a certain storage time.

Metallocene catalyst systems, too, or precisely those formed from the aluminoxane with the metallocenes, are considerably more stable in supported form than in solution.

Some possibilities for fixing alkylaluminoxanes to supports are already described in the literature:

EP-A-O 369 675 (Exxon Chemical) describes a process in which immobilization of alkylaluminoxanes by reaction of an approximately 10% strength solution of trialkylaluminum in heptane with hydrated silica (8.7% by weight of $H_2O$) is achieved.

In EP-A-O 442 725 (Mitsui Petrochemical), the immobilization is effected by reaction of a toluene/water emulsion with an approximately 7% strength solution of trialkylaluminum in toluene in the presence of silica at temperatures of −50° C. to +80° C.

U.S. Pat. No. 5,026,797 (Mitsubishi Petrochemical) opens up another alternative by reaction of already pre-prepared alkylaluminoxane solutions with silica (predried at 600° C.) at 60° C. and subsequent washing out of the non-immobilized alkylaluminoxane content with toluene.

Finally, U.S. Pat. No. 4,921,825 (Mitsui Petrochemical) describes a process for immobilizing alkylaluminoxane by precipitation from solutions in toluene by means of n-decane in the presence of silica.

Some of these processes are technically involved, since, inter alia, they include low reaction temperatures at the start or multi-stage working-up processes and, as a result, losses in yield in respect of the amount of aluminum employed in the form of aluminum trialkyls. Furthermore, the space/time yield is sometimes impaired considerably by the obligatory use of relatively large amounts of solvent.

Finally, the metallocene must also subsequently be fixed to the support in order to obtain an active polymerization catalyst. A further reaction step in a solvent is therefore necessary. As a result, the profitability of these systems is jeopardized once more.

Several possibilities likewise exist for fixing the metallocenes to the support.

Fixing to the support is understood as meaning, according to the definitions, immobilizing of the component employed on an inert support; the components are deposited on the support material in a manner such that subsequent elution by solvents is no longer possible.

Thus, on the one hand, the metallocene can be brought into contact from solution with the suspended supported aluminoxane, or the metallocene can first be reacted with the aluminoxane and the reaction product can subsequently be applied to the inert support. With both methods, the working-up steps are not trivial, since the success of the application to the support and the activity of the finished catalyst depend decisively on the reaction temperatures and the drying conditions (cf. EP-A-O 560 128, U.S. Pat. No. 5,308,815).

An object of the present invention is therefore to overcome these disadvantages of the prior art and to provide an economical process by means of which active catalysts for olefin polymerization comprising alkylaluminoxanes and metallocenes can be fixed to inert support materials in one process step, largely without the co-use of organic solvents, in a high yield and homogeneity and in a reproducible manner, the particle morphology of the support being retained and the products finally being in the form of free-flowing powders.

According to EP-A-O 672 671, it has been found that some of the disadvantages mentioned above can be eliminated by carrying out the synthesis of alkylaluminoxanes, in particular methylaluminoxanes (MAO) and fixing thereof to inert supports directly via the gas phase without any use of solvents and without additional process steps.

It has now been found that here also the metallocene can be supported in the gas phase simultaneously and together with or after the aluminoxane by varying the geometry of the unit, regardless of whether the aluminoxane has been prepared in the gas phase or according to the prior art after fixing to the support in the liquid phase and subsequent drying out conventionally or according to the invention.

In one variant of the procedure according to the invention, prepolymerization in one step is also possible, so that the end product is available immediately for the polymerization.

The resulting end products are free-flowing powders which can be employed directly as highly active catalysts for olefin polymerization. The particle morphology and particle size distribution are changed not adversely but rather positively within the process. The fines content of the support material can be built up by the application to the support within the gas phase, and on the other hand extremely small particles can also be removed in a controlled manner. By varying the gas streams and using suitable reactor types and reactor geometries, selected discharge of the product oriented to particle size is also possible. The particle size, the activity and the catalyst concentration can thus be adjusted by controlled adjustment of the operating parameters.

BRIEF SUMMARY OF THE INVENTION

The invention thus relates to a process for the preparation of metallocene catalyst systems, fixed on inert support materials, comprising organometallic compounds, water and metallocenes, which is characterized in that, in a first stage, the support materials, the organometallic compounds or solutions or suspensions thereof, and if appropriate water are introduced into the reactor with the gas stream and the reaction and the fixing of the reactants and/or of the reaction products to the support materials is carried out in the gas phase and if appropriate a metallocene or solution thereof is subsequently metered in with the gas stream and additionally fixed to the support materials, and in a second stage, drying of the supported systems thus prepared is likewise carried out in the gas phase and at the same time, if appropriate by metering an olefin into the gas phase, a prepolymerization is carried out.

The nature of the reactors is determined by the desired particle size, the amount of aluminoxane and the concentration of the metallocene, which may be present in solution, on the particle. In all cases fixing of the metallocene to the support in the gas phase and, if appropriate, subsequently a prepolymerization are possible, regardless of whether the fixing of the aluminoxane to the solid support takes place in the gas phase or in the liquid phase.

The invention furthermore relates to metallocene catalyst systems which are fixed on support materials and are prepared by the process according to the invention.

DETAILED DESCRIPTION OF THE DRAWINGS

DETAILED DESCRIPTION OF THE INVENTION

Figure 1:
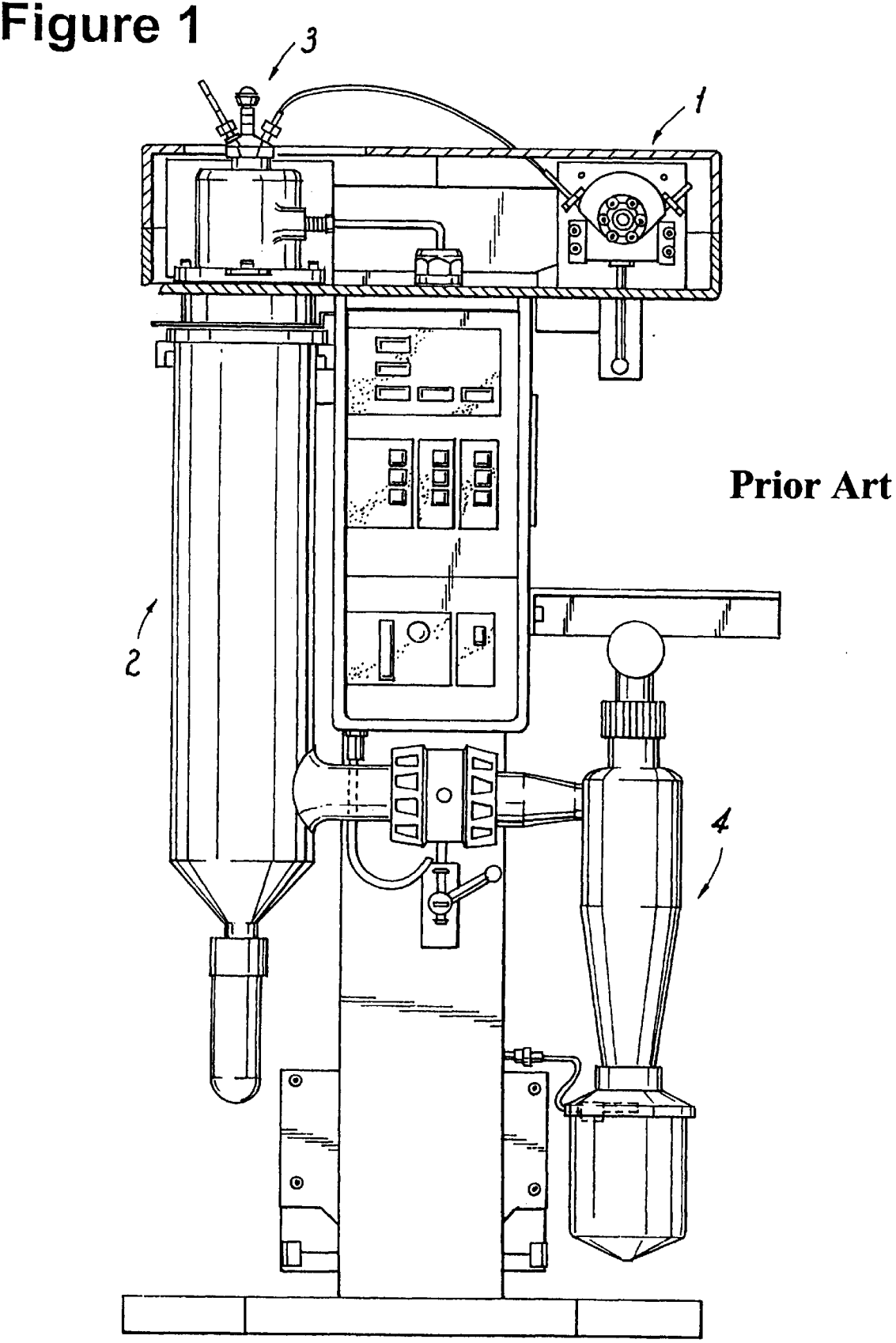
FIG. 1 is a drawing of a spray dryer reactor with which the process of the present invention can be carried out.

The preparation of the aluminoxane in the liquid phase is carried out by generally known processes (EP-A-0 623 624, U.S. Pat. Nos. 5,157,008, and 5,206,401) by hydrolysis of the alkylaluminum compounds with water. The support can then be loaded with aluminoxane by generally known processes, separated off from the liquid phase and after-treated in a drier in the form of moist particles. In this drying operation, in addition to removal of the solvent, the metallocene can be fixed at the same time.

In the drying processes of the supported catalyst systems prepared by the thermal processes known per se, the particle morphology of the support is adversely influenced by the mechanical stresses of the various processes. Powders result which have a nonuniform structure which deviates greatly from the starting support material and have a wider particle size distribution. Experience has shown that the polymers prepared with these catalyst systems have adverse physical properties.

These disadvantages do not occur during the drying and/or application to the support in gas phase reactors which are carried out according to the invention. By choosing suitable reactors and varying the gas streams used, discharge of a desired uniform fraction of the catalyst particles can be established for the first time. The reaction with an olefin to give the corresponding prepolymers can also take place in the same stage.

In the case of the reactors which can also be used according to the invention, the functions of reaction of the aluminum alkyls with water and/or metallocene and subsequent or simultaneous drying must be taken into account. Only certain types of reactor are therefore used.

These types of reactor are characterized by a high gas/solids ratio, moderate temperatures and spatial separation between the site of the introduction of the reactants and their discharge from the reaction system. During discharge, the gas stream, the evaporated solvent and the metallocene-aluminum catalyst should preferably be separated into the components at the same time, so that no harmful concentration of solvents remains in the catalyst systems.

Examples of suitable reactor types can be spray dryers, flow tubes, tumble dryers and fluidized bed dryers, which belong to the prior art in other fields of use. The process parameters used in these fields can be used in modified form in the procedures according to the invention.

Fluidization and marked loosening of the particles by a gas phase with later spatial separation of the gas phase from the solid particles are characteristic of all the reactors which can also be used according to the invention.

According to the invention, the cocatalyst which is to be dried and is fixed on the support, preferably moist aluminoxane or trimethylaluminum fixed on the support, water and the support are metered into the reactor and distributed by means of the gas stream. At the same time, the metallocene is metered in at the intake directly with the components or metered in at another point which is subsequent in position and/or time.

Supported metallocene catalysts which also meet the requirements of heterogeneous copolymerizations can be prepared by suitable combination of one or more metering nozzles and the use of one- or multi-component systems of the reactants.

After the solvent or the gas has been removed, a desired prepolymerization can be carried out directly without prior isolation of the catalyst.

In the continuous procedure, internal recycling of the particles after removal of the gas and solvent phase is possible. The gas phase and solvent can be separated off and/or recycled independently of one another. The solid particles and the gas phase can be exchanged continuously during operation.

In the case of a multi-stage procedure, an ideal combination of the reactor systems is possible. Examples which may be mentioned are the combinations of a spray dryer with a flow tube or a fluidized bed dryer to give a spray/flow tube dryer, spray/flow tube reactor, spray/fluidized bed reactor or spray/fluidized bed dryer. The mode of operation of these reactors/dryers belongs to the general prior art. The dryer reactors can be operated from the vacuum range up to the medium pressure range of $10^6$Pa. This depends on the one hand on the maximum heat to which the substrates to be dried can be exposed, and on the other hand on the evaporation enthalpy of the solvents to be separated off.

Other advantages of the dryer reactors lie in a short contact time and therefore in low exposure of the catalyst to heat in the reactor/dryer systems according to the invention. Although the drying stage in gas phase reactors in the overall process is preferred according to the invention drying can also be used as a separate process. In this procedure, all systems obtained in the form of suspensions and solutions by conventional processes and any mixture thereof with inert supports can be dried advantageously and gently.

The alkanes obtained as reaction products can furthermore serve to maintain the gas streams if they are in gaseous form under the given reaction conditions. The reactants trialkylaluminum, in particular trimethylaluminum (TMA), and water, as well as the metallocene solution, can advantageously be metered into the reactors used according to the invention via the gas streams used. Both the desired methyl/aluminum ratio of the alkylaluminoxane and the degree of loading of the support can be controlled systematically by regulating the particular gas streams. In the case of support materials suitable for this, such as, for example, $SiO_2$, the reactant water can furthermore be introduced in a form bonded to the surface of the support.

Continuous operation of the unit is possible both in the case of direct feeding of the trialkylaluminum, in particular trimethylaluminum (TMA) and water in gaseous or sprayed form into the gas phase (the gas stream serves here solely to maintain the fluidization of the support material) and in the case of feeding of catalyst systems supported in suspended form. In all cases, the original particle morphology and particle size distribution of the support is retained or can be controlled.

The solvent is replaced during the gas phase treatment and can be separated off in a downstream separating device. The end product is therefore largely free from solvent contents.

Support materials which can be used according to the invention and are employed include the porous oxides of one or more of the elements of main groups II, III or IV and of sub-group II and IV of the Periodic Table, such as $ZrO_2$, $TiO_2$, $B_2O_3$, CaO, ZnO, BaO and, preferably, $Al_2O_3$ and MgO, and in particular $SiO_2$.

These support materials can have particle sizes in the range of 1–300 μm, preferably 10–200 μm; surfaces of 10–1000 $m^2$/g, in particular 100–500 $m^2$/g; and $N_2$ pore volumes of 0.5–3 $cm^3$/g, preferably 1–2 $cm^3$/g.

These supports are commercially available materials which have the values stated in random distribution.

The water content of the support materials can vary between about 0 and 15% by weight, depending on the procedure. The desired water contents can be established by the generally known hydration processes or calcining processes on commercially available support materials.

According to the invention, supported "metallocene catalyst system" is understood as meaning the components of co-catalyst (for example aluminoxane, organoboron compounds) and combinations thereof with the metallocenes mentioned.

These compounds which can additionally be used according to the invention and their preparation and use are described in detail in EP-A-0 480 390, EP-A-0 413 326, EP-A-0 530 908, EP-A 0 344 887, EP-A 0 420 436, EP-A 0 416 815 and EP-A 0 520 732.

The molar ratio of water to alkylaluminum compounds, in particular trimethylaluminum, for preparation of -he aluminoxanes can be in ranges from 0.5:1 to 1.5:1, preferably 0.7:1 to 1.3:1, and can be adjusted to the desired value.

Organoaluminum compounds which can be used are in principle all the compounds customary in this field which can be hydrolyzed with water to give aluminoxanes. Compounds which are preferred according to the invention are trialkylaluminum compounds $(R)_3Al$ with short-chain alkyl radicals having 1–10 C atoms, in particular 1–5 C atoms, such as the methyl, ethyl, propyl, isopropyl, butyl, isobutyl, tert-butyl or pentyl radicals. Trimethylaluminum is preferred according to the invention.

The ratio of support to aluminoxane can be varied within relatively wide limits. If desired, support-free aluminoxane (aluminum content theoretically not more than 46.5% by weight) can be prepared with the process according to the invention. Conditions are preferably chosen according to the invention such that 3–40% by weight of aluminum, preferably 5–30% by weight of aluminum, is present in the form of aluminoxanes on the resulting free-flowing powder of support material and aluminoxane.

In addition to these compounds, other cocatalysts can also be used according to the invention, such as, in particular, organoboron compounds, such as, for example, tris [pentafluorophenyl]boron, triphenylcarbonium tetrakis [pentafluorophenyl]borate and N,N-dimethyl-anilinium tetrakis[pentafluorophenyl] borate.

All compounds which are used in metallocene-catalyzed polymerization are available as the metallocene component, such as, for example, bridged or nonbridged metallocene sandwich complexes and corresponding semi-sandwich complexes.

The metallocene catalysts are prepared by metering in the metallocene solution according to the requirements imposed on the catalyst system. Between 0.1 and 30% by weight of metallocene, which is introduced into the fluidized bed in the form of its solution, preferably between 0.5 and 15%, can be supported.

The metallocene component is introduced in a manner such that an aluminum-metallocene ratio (based on the ME=metallocene central atom) resulting in the formation of a highly active catalyst is established. This Al:ME molar ratio is typically 5000:1 to 10:1, in particular 500:1 to 50:1.

For this, after formation of the aluminoxane the metallocene is metered in such that the metallocenium catalyst system formed can form on the support material or is first deposited on the support as a complete system.

All olefins which can be used for preparation of the active catalyst compound or which are used in the polymerization can be used as the prepolymer olefin. In addition to ethene these include, in particular, alpha-olefins, such as, for example, 1-propene or 1-hexene.

The prepolymerization is carried out as a function of time by metering in the olefin according to the needs of the subsequent polymerization.

For this, after supporting of the aluminoxane or of the metallocene catalyst system, the monomeric olefin can be introduced into the gas stream via a nozzle and thus form the prepolymer. The same volume streams which are also used for the supporting of the aluminoxane component are used here.

The process according to the invention allows the preparation of supported metallocene catalyst systems with virtually quantitative yields of immobilized aluminum and metallocene, based on the components employed. Because the process conditions can be adjusted in a controlled manner and are reproducible, these supported metallocene catalyst systems prepared by the process according to the invention have high activities and are therefore outstandingly suitable for olefin polymerization.

Furthermore, by simple combination with a prepolymerization in the same procedure and unit, the preparation of prepolymers which can be employed directly for some polymerization processes is also possible.

The supported catalyst systems and prepolymers prepared by the process according to the invention can be employed without problems in the known olefin polymerization processes, such as, for example, also WO 94/14856 or U.S. Pat. Nos. 5,086,025 or 5,234,878.

EXAMPLES

The process according to the invention is illustrated in the following with the aid of examples. The values for the process variables—temperature, pressure and volume streams—stated in the examples are values averaged over the entire experimental procedure. The experiments were carried out such that these mean values were within the preferred range.

Scale-up studies show mass and volume stream ratios which can be regulated to constant values.

The process parameters can be used within the stated minima and maxima to vary or optimize products.

The process parameters stated can be largely used for the various types of reactor which can be used. Adjustments of the process parameters according to the type of reactor are a part of general expertise.

General Information on the Reaction Parameters for Carrying Out the Processes According to the Invention in a Laboratory Apparatus

| Weight of support: | maximum | 100.0 g |
|---|---|---|
| | minimum | 10.0 g |
| | preferred range | 35.0–50 g |
| Temperature: | minimum | 2° C. |
| | maximum | 120° C. |
| | preferred range | 20° C. – 90° C. |
| Pressure: | | |
| Pressure variations result from the nature of the gas phase reactor and the degree of loading. | | |
| | minimum | $0.5 \cdot 10^4$ Pa |
| | maximum | $20 \cdot 10^4$ Pa |
| | preferred range | $1–1.5 \cdot 10^4$ Pa |
| Volume streams | maximum | 2000 l/minute |
| | minimum | 50 l/minute |
| | preferred range | 200 l/minute 1200 l/minute |
| Residence time in the gas phase: | minimum | 0.1 second |
| | maximum | 10 seconds |
| | preferred range | 0.1 second–5 seconds |

Example 1

Referring to FIG. 1, depicting a spray dryer reactor with which this embodiment of the process was practiced:

A suspension of silica in toluene or another inert solvent was introduced via a hose pump 1 under inert conditions into the spray tower 2 in a spray drying apparatus from Büchi (B 191) with a modified spray nozzle and with modification of the gas feed such that it was possible to use an inert gas atmosphere (nitrogen). By using a commercially available multi-component nozzle 3 (3-component nozzle, heated, with a diameter of 0.7 mm), it was possible to meter in the silica suspension, the aluminum alkyl, in particular trimethylaluminum, and water. After adjustment of the part streams, application of the aluminoxane to the support with simultaneous removal of the organic inert suspending agent in the gas phase was thus possible. After separation in a cyclone 4, the supported product was obtained in the form of a free-flowing, solvent-free powder. The characteristic particle morphology parameters of the silica remained largely unchanged during the in situ application to the support by this gentle treatment.

50 g of silica (type Grace Sylopol 2104; average particle size 80 $\mu$m, average surface area 280–310 m$^2$/g, pore volume 1.5 ml/g, water content 3.5–7%) was suspended in 150 g of dry toluene under a nitrogen atmosphere. This suspension was fed to the nozzle of the spray dryer reactor via a hose pump. At the same time as the silica suspension, trimethylaluminum and water were sprayed into this nozzle. The temperature in the spray dryer reactor was kept constant at 100° C. The gas streams for spraying and for conveying the gas phase were chosen such that about 2–4 ml of suspension were conveyed and sprayed per minute. The metering speeds for the water and trimethylaluminum were chosen such that 0.25 g of water was metered per g of trimethylaluminum. A total of 67.8 g of trimethylaluminum and 17 g of water were metered. After 72 minutes, the metering was ended. 112 g, corresponding to a yield of 91%, were obtained as a free-flowing powder with an aluminum content of 24.8% and a methyl/aluminum ratio of 1:1.07.

Example 2

Metering of metallocene solution.

Using the spray dryer reactor shown in FIG. 1, 100 ml of a 1% strength metallocene solution (bis[n-butylcyclopentadienyl]zirconium dichloride) in toluene were metered in the multi-component spray nozzle of the Büchi spray dryer reactor into a suspension of 50 g of the supported aluminoxane system prepared in Example 1 in 150 g of dry toluene under an inert nitrogen atmosphere such that 20 ml of support suspension were sprayed/metered per millilitre of metallocene solution. The temperature of the spray tower was kept at 100° C. The product was a yellowish-brown, solvent-free free-flowing powder with an aluminum content of 24.7% and a zirconium content of 0.44%, corresponding to an Al:Zr ratio of 189:1.

Example 3

Using the spray dryer reactor of FIG. 1, 565 g of methylaluminoxane solution (aluminum content of 5.5%) and 220 ml of a 1% strength metallocene solution (corresponding to Example 2), prepared by known processes, were added to a suspension of 50 g of silica (corresponding to Example 1) in 150 g of dry toluene and the mixture was sprayed via a hose pump into a Büchi spray dryer (aspirator—nitrogen—100%, hose pump 45%, 100° C. inlet temperature, heated single nozzle 0.7 mm, spraying time 104 minutes). 115 g, corresponding to a yield of 94%, were obtained as a yellowish-brown, solvent-free (residual toluene content <0.1%) free-flowing powder with an aluminum content of 24.6%o and a zirconium content of 0.37%.

Comparison Example 3a)
Conventional Drying According to the Prior Art.

200 g of a suspension corresponding to Example 3 were introduced into a 3-necked flask under a nitrogen atmosphere and the suspending agent was largely filtered off with suction over a reverse frit. The residue which remained was dried in vacuo (50° C., 12 hours, 0.1 hPa). The product had a residual toluene content of 5.3%, an aluminum content of 23.2% and a zirconium content of 0.35%.

Example 4

Figure 2:
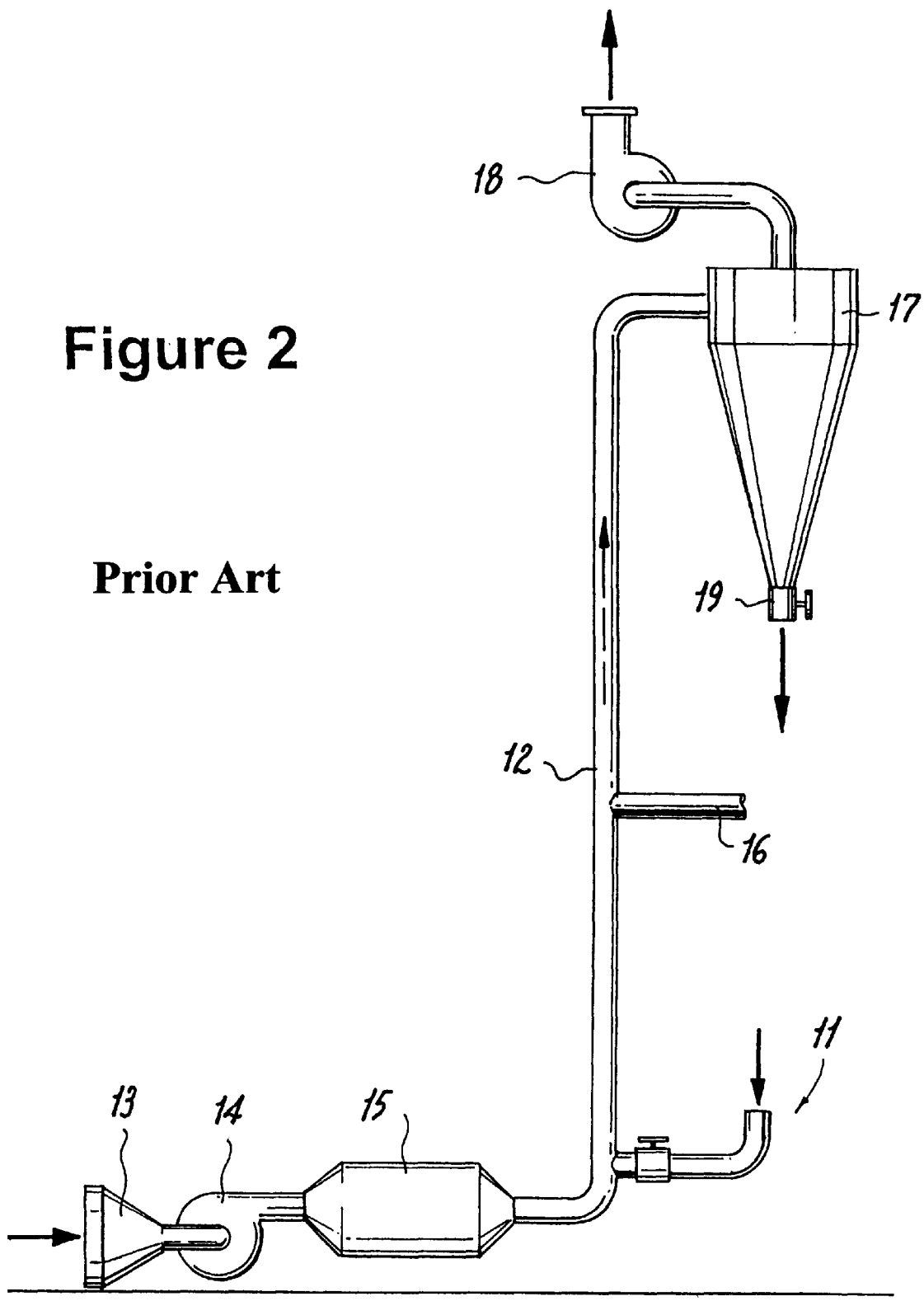
FIG. 2 is a drawing of a flow tube reactor with which the process of the present invention can be carried out.

This embodiment used a flow tube reactor, depicted in FIG. 2, to which reference is hereby made. A suspension corresponding to Example 3 was fed via a hose pump to the lower part 11 of a flow tube dryer 12 (tube diameter 50 mm, length 2000 mm). The gas streams were fed through gas inlet 13 and fan 14 with an empty tube gas speed of 6 m/second so that the material was transported and deposited there in completely dry form. The temperature of the gas stream fed in was adjusted to 80° C. in heater 15. The metallocene solution (bis-[n-butylcyclopentadienyl]zirconium dichloride) was metered into flow tube 12 via a nozzle 16 at a height of 800 mm. The material was then passed into a cyclone 17 from which waste gas stream 18 and product stream 19 were separately discharged. The product showed the following characteristics: aluminum content 24.6%, zirconium content 0.39%.

Example 5

Using a fluidized bed reactor, 50 g of silica-supported catalyst system (corresponding to Example 3) in the form of a suspension in an inert organic suspending agent (toluene suspension here) or as a moist filter cake were introduced into a fluidized bed reactor. The gas streams were regulated such that a stationary fluidized bed was built up. The gas stream was heated (to 50° C.) and the suspension was thus gently freed from solvent. The drying time was about 2.5 hours. The yield was quantitative; the product had an aluminum content of 24.7%, a zirconium content of 0.41% and a residual toluene content of 0.1%.

Example 6
Fluidized Bed Reactor

1% by volume of an olefin (ethene) were metered together with the gas stream into 50 g of the product from Example 5, retaining the same process parameters. It was possible to calculate back the prepolymerization which takes place, with the aid of the weight increase and the metering time. With recycling of the gas streams, it was possible for the olefin to be absorbed virtually quantitatively from the carrier gas stream. The product showed a weight increase of 2.6%; and could be isolated quantitatively. The aluminum content was 24.0% and the zirconium content was 0.39%.

Figures:

(Sources: FIG. 1: Büchi AG, operating instructions for Mini Spray Dryer B-191; FIG. 2: Lehrbuch der Verfahrenstechnik [Textbook of process technology], Leipzig 1967, VEB Verlag für Grundstoffindustrie)

What is claimed is:

1. A supported metallocene catalyst prepared by the steps comprising:
    (i) introducing in a first stage, a gas stream comprising an organoaluminum compound, an inert support material, a metallocene and water, into a first gas phase reaction;
    (ii) allowing the mixture provided in step (i) to react under conditions effective to form an aluminoxane supported with said metallocene and said inert support material; and
    (iii) drying, in a second stage, said supported metallocene catalyst, wherein said drying is carried out in a gas phase reactor.

2. The supported metallocene catalyst according to claim 1 wherein the organoaluminum compound is an alkylaluminum compound.

3. The supported metallocene catalyst according to claim 2 wherein the organoaluminum compound is trimethylaluminum.

4. The supported metallocene catalyst according to claim 1 wherein said water and said organoaluminum compound are employed in amounts such that the molar ratio of water: organoaluminum compound is the range of from 0.5:1 to 1.5:1.

5. The supported metallocene catalyst according to claim 1 wherein said metallocene and said organoaluminum compound are employed in amounts such that the molar ratio of metallocene: organoaluminum compound is in the range from 1:500 to 1:10.

6. The supported metallocene catalyst according to claim 5 having from 3%–40% by weight of aluminum based on the weight of the finished catalyst composition in the form of an aluminoxane supported on said inert support material.

7. The supported metallocene catalyst according to claim 5 having from 0.1%–30% by weight metallocene based on the weight of the finished catalyst composition supported on said inert support material.

8. A supported metallocene catalyst prepared by the steps comprising:
    (i) introducing in a first stage, a gas stream comprising an organoaluminum compound, an inert support material and water, into a first gas phase reactor;
    (ii) allowing the mixture provided in step (i) to react under conditions effective to form an aluminoxane supported on said inert support material;
    (iii) metering a second gas stream comprising a metallocene into said gas phase reactor;
    (iv) allowing said mixture formed in step (iii) to react under conditions effective to form a supported metallocene catalyst; and
    (v) drying, in a second stage, said supported metallocene catalyst, wherein said drying is carried out in a gas phase reactor.

9. The supported metallocene catalyst according to claim 8 wherein the organoaluminum compound is an alkylaluminum compound.

10. The supported metallocene catalyst according to claim 9 wherein the organoaluminum compound is trimethylaluminum.

11. The supported metallocene catalyst according to claim 8 wherein said water and said organoaluminum compound are employed in amounts such that the molar ratio of water organoaluminum compound is the range of from 0.5:1 to 1.5:1.

12. The supported metallocene catalyst according to claim 8 wherein said metallocene and said organoaluminum compound are employed in amounts such that the molar ratio of metallocene: organoaluminum compound is in the range from 1:500 to 1:10.

13. The supported metallocene catalyst according to claim 12 having from 3%–40% by weight of aluminum based on the weight of the finished catalyst composition in the form of an aluminoxane supported on said inert support material.

14. The supported metallocene catalyst according to claim 12 having from 0.1%–30% by weight metallocene based on the weight of the finished catalyst composition supported on said inert support material.

15. A supported metallocene catalyst prepared by the steps comprising:
  (i) introducing, in a first stage, a gas stream comprising an aluminoxane and an inert support material into a gas phase reactor;
  (ii) metering a second gas stream comprising a metallocene into said gas phase reactor;
  (iii) allowing said mixture formed in step (ii) to react in said gas phase reactor under conditions effective to form a supported metallocene catalyst; and
  (iv) drying in a second stage, said supported metallocene catalyst, said drying being carried out in said gas phase reactor.

16. The supported metallocene catalyst according to claim 15 wherein the aluminoxane is methylaluminoxane.

17. The supported metallocene catalyst according to claim 15 wherein the aluminoxane is prepared by reacting an organoaluminum compound with water.

18. The supported metallocene catalyst according to claim 17 wherein the organoaluminum compound is an alkylaluminum compound.

19. The supported metallocene catalyst according to claim 18 wherein the organoaluminum compound is trimethylaluminum.

20. The supported metallocene catalyst according to claim 15 wherein the aluminoxane is introduced into the gas stream as a toluene solution, and the toluene is subsequently, removed therefrom.

21. The supported metallocene catalyst according to claim 15 wherein the aluminoxane is fixed to the inert support material in the gas phase reactor prior to step (ii).

22. The supported metallocene catalyst according to claim 17 wherein water and organoaluminum compound are employed in amounts such that the molar ratio of water:organoaluminum compound is in the range of from 0.5:1 to 1.5:1.

23. The supported metallocene catalyst according to claim 17 wherein the metallocene and said organoaluminum compound are employed in amounts such that the molar ratio of metallocene:organoaluminum compound is in the range from 1:500 to 1:10.

24. The supported metallocene catalyst according to claim 15 having from 3%–40% weight aluminum based on the weight of the finished catalyst composition in the form of an aluminoxane supported on said inert support material.

25. The supported metallocene catalyst according to claim 15 having from 0.1% to 30% by weight metallocene based on the weight of the finished catalyst composition supported on said inert support material.

26. A supported metallocene catalyst prepared by the steps comprising:
  (i) introducing in a first step a gas stream comprising an aluminoxane, an inert support material and a metallocene;
  (ii) allowing the mixture provided in step (i) to react under conditions effective to form an aluminoxane supported with said metallocene and said inert support material; and
  (iii) drying, in a second stage, said supported metallocene catalyst in said gas phase reactor.

27. The supported metallocene catalyst according to claim 26 wherein the aluminoxane is methylaluminoxane.

28. The supported metallocene catalyst according to claim 26 wherein the aluminoxane is prepared by reacting an organoaluminum compound with water.

29. The supported metallocene catalyst according to claim 28 wherein the organoaluminum compound is an alkylaluminum compound.

30. The supported metallocene catalyst according to claim 29 wherein the organoaluminum compound is trimethylaluminum.

31. The supported metallocene catalyst according to claim 28 wherein water and the organoaluminum compound are employed in amounts such that the molar ratio of water:organoaluminum compound is in the range of from 0.5:1 to 1.5:1.

32. The supported metallocene catalyst according to claim 28 wherein the metallocene and said organoaluminum compound are employed in amounts such that the molar ratio of metallocene:organoaluminum compound is in the range from 1:500 to 1:10.

33. The supported metallocene catalyst according to claim 26 having from 3%–40% weight aluminum based on the weight of the finished catalyst composition in the form of an aluminoxane supported on said inert support material.

34. The supported metallocene catalyst according to claim 26 having from 0.1% to 30% by weight metallocene based on the weight of the finished catalyst composition supported on said inert support material.

* * * * *